United States Patent [19]

Gilles

[11] 4,145,511

[45] Mar. 20, 1979

[54] HYDROXYL-CONTAINING LIQUID POLYMERS AND PRESSURE-SENSITIVE ADHESIVES AND LAMINATES PREPARED THEREFROM

[75] Inventor: Jack C. Gilles, Shaker Heights, Ohio

[73] Assignee: The B. F. Goodrich Company, Akron, Ohio

[21] Appl. No.: 829,699

[22] Filed: Sep. 1, 1977

[51] Int. Cl.² .................... B32B 27/40; C08G 18/62; C08G 18/63
[52] U.S. Cl. ......................... 528/73; 528/75; 528/905; 260/326.26; 526/263; 428/425
[58] Field of Search .................. 260/77.5 CR; 528/73, 528/75, 905; 428/425

[56] References Cited

U.S. PATENT DOCUMENTS

| | | | |
|---|---|---|---|
| 3,028,367 | 4/1962 | O'Brien | 260/77.5 |
| 3,245,941 | 4/1966 | Mayer et al. | 260/77.5 CR |
| 3,369,959 | 2/1968 | Noyes | 260/77.5 CR |
| 3,532,652 | 10/1970 | Zang et al. | 260/77.5 CR |
| 3,553,174 | 1/1971 | Hausslein et al. | 260/77.5 CR |
| 3,632,789 | 1/1972 | Wilhelm et al. | 260/77.5 CR |
| 3,681,289 | 8/1972 | Kruse et al. | 260/77.5 CR |
| 3,853,822 | 12/1974 | Brod et al. | 260/77.5 CR |
| 3,970,717 | 7/1976 | Mueller Albrecht et al. | 260/77.5 CR |

*Primary Examiner*—H.S. Cockeram
*Attorney, Agent, or Firm*—Charles A. Crehore

[57] ABSTRACT

Hydroxyl-containing alkyl acrylate liquid polymers containing polymerized therein from about 1 weight percent to about 20 weight percent N-vinyl-2-pyrrolidone have improved clarity, and pressure-sensitive adhesives made from such liquid polymers have both improved clarity and adhesion.

35 Claims, No Drawings

HYDROXYL-CONTAINING LIQUID POLYMERS AND PRESSURE-SENSITIVE ADHESIVES AND LAMINATES PREPARED THEREFROM

BACKGROUND OF THE INVENTION

Pressure-sensitive adhesives made from either hydroxyl-terminated polymers or random-hydroxylated polymers are known in the art. U.S. Pat. No. 3,515,773 discloses preparation of pressure-sensitive adhesives from (A) a hydroxyl-terminated diene polymer, and (B) an isocyanate-terminated polyether prepolymer. U.S. Pat. No. 3,532,652 teaches preparation of pressure-sensitive adhesives from (A) an acrylate polymer containing a hydroxylated monomer randomly polymerized therein, and (B) an isocyanate-terminated polyester or polyether prepolymer. Such adhesives typically are deficient in clarity required for certain applications, such as where two clear films are to be laminated to one another using a pressure-sensitive adhesive. A new hydroxylated liquid polymer and a pressure-sensitive adhesive made therefrom are desired, both having improved clarity. Moreover, improved 180° peel adhesion of the adhesive is desired, if for no other reason than to provide a range of adhesive properties for different applications.

SUMMARY OF THE INVENTION

Hydroxyl-containing alkyl acylate liquid polymers containing polymerized therein from about 1 weight percent to about 20 weight percent N-vinyl-2-pyrrolidone have improved clarity, and pressure-sensitive adhesives made from such liquid polymers have both improved clarity and 180° peel adhesion. The liquid polymers contain both terminal and random hydroxyl functionality, and pressure-sensitive adhesives are produced by reacting the liquid polymers with at least one prepolymer of (1) a polyalkylene ether glycol or polyester glycol and (2) an excess amount of an aromatic diisocyanate.

DETAILED DESCRIPTION

Hydroxyl-containing alkyl acrylate liquid polymers containing polymerized therein from about 1 weight percent to about 20 weight percent N-vinyl-2-pyrrolidone have improved clarity, and pressure-sensitive adhesives made from such liquid polymers have both improved clarity and 180° peel adhesion. The liquid polymers contain both terminal and random hydroxyl functionality. Pressure-sensitive adhesives are produced by reacting such liquid polymers with at least one prepolymer of (1) a polyalkylene ether glycol or polyester glycol and (2) an excess amount of an aromatic diisocyanate.

I. ALKYL ACRYLATE LIQUID POLYMERS

Alkyl acrylate liquid polymers of this invention contain polymerized therein from about 1 weight percent to about 20 weight percent N-vinyl-2-pyrrolidone. They contain both terminal and random hydroxyl functionality, with an average from about 1.4 to about 6 hydroxyl groups per molecule, more preferably from about 1.7 to about 3.5 hydroxyl groups per molecule.

Random Hydroxyl Functionality

Random hydroxyl functionality is defined as the presence of hydroxyl group(s) which are pendant from a portion of the polymeric backbone other than the ends, e.g., when a hydroxyl-containing comonomer such as 2-hydroxyethyl acrylate or vinyl benzyl alcohol is used. Excellent results were obtained using 2-hydroxyethyl acrylate. Alternatively, a carboxylated comonomer such as acrylic acid or the like may be used, and after polymerization to prepare the alkyl acrylate liquid polymer is complete, some or all of the carboxyl groups may be reacted with ethylene oxide, butanediol, or the like to produce hydroxyl groups. Excellent results were obtained using ethylene oxide, which when reacted with acrylic acid units in the polymeric backbone, produced backbone units equivalent to 2-hydroxyethyl acrylate.

Terminal Hydroxyl Functionality

Terminal hydroxyl groups are included in the alkyl acrylate liquid polymers using methods known in the art. Suitable methods include the four that follow, with methods 1 and 4 being preferred.

Method #1

A carboxyl-terminated alkyl acrylate liquid polymer intermediate can be produced by the method of Siebert U.S. Pat. No. 3,285,949, i.e., by polymerizing at least one alkyl acrylate monomer in a solvent with low chain transfer potential, preferably t-butanol, using a bisazocyano acid initiator having the formula

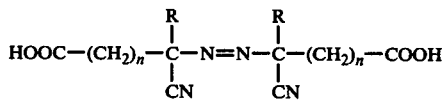

wherein n is an integer from 1 to 6 and R is an alkyl group containing 1 to 3 carbon atoms. Azodicyanovaleric acid is a preferred initiator for production of the carboxyl-terminated liquid polymer intermediate. Terminal hydroxyl groups may be introduced by reacting the carboxyl-terminated intermediate with ethylene oxide in the presence of a tertiary amine catalyst such as trimethylamine according to the process of Siebert U.S. Pat. No. 3,712,916.

Method #2

Alternatively, the carboxyl-terminated intermediate just described may be reacted with a diol in the presence of an acid catalyst according to the process of Siebert U.S. Pat. No. 3,699,153. The resulting product is a hydroxyl-terminated alkyl acrylate liquid polymer.

Method #3

Hydroxyl-terminated liquid polymers containing sulfide linkages near the terminal portions of the polymer molecule are prepared by photopolymerizing at least one alkyl acrylate in the presence of (a) at least one hydroxyl-containing disulfide and (b) ultraviolet radiation. The hydroxyl-containing disulfides may have the formula $HO(C_nH_{2n}O)_m(C_nH_{2n})_p-S-S-(C_nH_{2n})_p(OC_nH_{2n})_mOH$ or

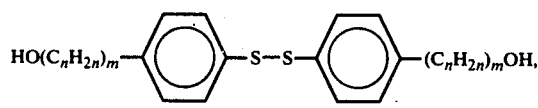

wherein m is an integer from 0 to 10, more preferably from 0 to 4, n is an integer from 1 to 10, more preferably from 1 to 4, and p is an integer from 1 to 10, more preferably from 1 to 4. Examples of suitable hydroxyl-containing disulfides include 2-hydroxyethyl disulfide, 3-hydroxypropyl disulfide, and the like. Excellent results were obtained using 2-hydroxyethyl disulfide. The disulfide acts both as a polymerization initiator and as a polymerization modifier. The amount of hydroxyl-containing disulfide will vary according to the desired polymeric molecular weight but typically is from about 1 to 20 weight percent, more preferably from 1 to 10 weight percent, based upon total monomeric weight.

Ultraviolet (UV) radiation suitable for use in method #3 may have a wave length from about 1850Å to about 6000Å, more preferably from about 2,400Å to about 4,000Å. Common sources of UV radiation include mercury lamps and arcs, carbon arcs and hydrogen discharge tubes. The vessel in which the polymerization is conducted may be transparent to light of the desired wave length, with the UV light source located external to the vessel so that light can pass through the sides of the vessel. Suitable glasses are available commercially and include borosilicates ("Pyrex"), "Vycor", or soft glass. Alternatively, the UV light source may be placed within the reaction vessel, either directly above the surface of the reaction mixture or within the mass of the reaction mixture. In some cases a sensitizer may be useful in catalytic amounts to accelerate the photopolymerization, including ketones such as acetone, benzophenone, and the like.

The photopolymerization may be conducted by any method known to the art, including bulk, solution, suspension and emulsion methods. Solvents for the monomer and/or polymer can be used during polymerization, including benzene, aliphatic hydrocarbons such as hexane and heptane, and alcohols such as methanol, ethanol, t-butanol, and the like. Well known suspension techniques comprise suspending the monomeric material, preferably already mixed with the hydroxyl-containing disulfide, in the form of small particles in a nonsolvent liquid such as water, together with a suspending agent to aid in maintaining the particles separate from one another during polymerization. Suitable suspending agents include starch, carboxymethylcellulose, and the like. Emulsion polymerization is similar, except that emulsifiers are used to produce much smaller particles, and the end product is a stable aqueous emulsion of the polymer. Suitable emulsifiers include sodium or potassium fatty acid soaps, sodium alkaryl sulfonates, and the like.

Method #4

Hydroxyl-terminated liquid polymers containing sulfide linkages near the terminal portions of the polymer are prepared by thermal polymerization (typically at about 80°-90° C.) of at least one alkyl acrylate in the presence of (a) at least one hydroxyl-containing disulfide described heretofore, and (b) an initiator such as azoisobutyronitrile. Solvents, suspending agents, sensitizers, etc., may be the same as for method #3 described heretofore.

Air or oxygen has an inhibiting effect on the reactions by the above four methods and preferably is excluded from the reaction vessel. Therefore, the reaction vessel desirably is flushed with nitrogen before the vessel is charged and a nitrogen purge may be continued if necessary to exclude air during polymerization. The reaction generally is conducted with stirring at about 80°-90° C., with cooling provided if necessary. The polymerization rate may be monitored by withdrawing reaction mixture samples at periodic intervals for percent conversion analysis. The reaction can be run to 100% conversion, but it generally is more economical to run to about 70-98% conversion and recover unreacted monomer for reuse. The hydroxyl-containing liquid polymer may be purified by vacuum distillation or by washing with water in order to remove the unreacted hydroxyl-containing disulfide, followed by drying the polymer. The structure of the hydroxyl-containing liquid polymer can be confirmed by infrared analysis, together with well known wet chemical methods for determination of hydroxyl and sulfur content. Number average molecular weights ($\overline{M}_n$) can be measured using vapor pressure osmometry, gel permeation chromatography, or the like.

Molecular Weight and Polymer Backbone

The alkyl acrylate liquid polymers containing both terminal and random hydroxyl functionality may have molecular weights ($\overline{M}_n$) from about 1,000 to about 6,000 as determined by cryoscopic, ebullioscopic or osmometric methods; more preferably the molecular weights may be from about 2,000 to about 4,000. The hydroxylated liquid alkyl acrylate polymers may have Brookfield viscosities at 25° C. from about 50,000 cps. to about 2,000,000 cps., more preferably from about 200,000 cps. to about 1,000,000 cps.

The hydroxylated liquid acrylate polymers contain polymerized therein at least about 65 wt.%, more preferably at least about 85 wt.%, of at least one alkyl acrylate wherein the alkyl group contains from 3 to 10 carbon atoms, more preferably from 3 to 8 carbon atoms. The alkyl acrylate forms the backbone of the hydroxylated liquid polymer. Examples of suitable alkyl acrylates as the primary components of the polymer backbone include n-butyl acrylate, n-hexyl acrylate, 2-ethylhexyl acrylate and the like, and mixtures thereof. Excellent results were obtained using n-butyl acrylate. The hydroxylated alkyl acrylate liquid polymers must also contain from about 1 wt.% to about 20 wt.% N-vinyl-2-pyrrolidone, more preferably from about 2 wt.% to about 10 wt.% N-vinyl-2-pyrrolidone. Of course, the hydroxylated alkyl acrylate liquid polymers also contain groups providing terminal and random hydroxyl functionality as described in detail heretofore. The balance of the polymer, typically from 0 to 32 wt.%, may contain copolymerized therein at least one other olefinically unsaturated monomer, more preferably at least one other vinylidene monomer (i.e., a monomer containing at least one terminal $CH_2=C<$ group per molecule) in the polymeric backbone.

Preferred vinylidene comonomers in the polymeric backbone include (a) dienes containing 4 to 10 carbon atoms, more preferably 4 to 8 carbon atoms, such as butadiene, isoprene, 2-isopropyl-1,3-butadiene, chloroprene, and the like; (b) vinyl nitriles having the formula

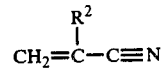

wherein $R^2$ is hydrogen or an alkyl group containing 1 to 3 carbon atoms, such as acrylonitrile, methacrylonitrile, and the like; and (c) acrylates having the formula

wherein $R^3$ is hydrogen or an alkyl radical containing 1 to 3 carbon atoms, and $R^4$ is hydrogen or an alkyl radical containing 1, 2, or 11 to 18 carbon atoms, or an alkoxyalkyl, alkylthioalkyl, or cyanoalkyl radical containing 2 to 12 carbon atoms, more preferably 2 to 8 carbon atoms. Alternatively, $R^3$ may be an alkyl radical containing 1 to 3 carbon atoms and $R^4$ an alkyl radical containing 3 to 10 carbon atoms. Suitable acrylates include ethyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate, and the like. Comonomeric mixtures may also be used. Excellent results were obtained using butadiene, ethyl acrylate, and/or acrylonitrile comonomers together with n-butyl acrylate as the principal monomer.

Other suitable vinylidene comonomers include (d) vinyl aromatics having the formula

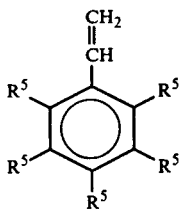

wherein $R^5$ is hydrogen, halogen or an alkyl radical containing 1 to 4 carbon atoms, such as styrene, methyl styrene, chlorostyrene, vinyl toluene, and the like; (e) vinyl and allyl esters of carboxylic acids containing 2 to 8 carbon atoms such as vinyl acetate, vinyl propionate, allyl acetate, and the like; (f) vinyl and allyl ethers of alkyl radicals containing 1 to 8 carbon atoms such as vinyl methyl ether, allyl methyl ether, and the like; and (g) monoolefins containing 2 to 14 carbon atoms, more preferably 2 to 8 carbon atoms, such as ethylene, propylene, isobutylene, 1-butene, 1-pentene, 1-hexene, 1-dodecene, and the like.

Also suitable as vinylidene comonomers are (h) vinyl halides such as vinyl bromide, vinyl chloride, and the like; (i) divinyls and diacrylates such as divinyl benzene, divinyl ether, diethylene glycol diacrylate, and the like; (j) amides of α,β-olefinically unsaturated carboxylic acids containing 2 to 8 carbon atoms such as acrylamide, and the like; (k) hydroxyl-containing vinylidene monomers for the purpose of including some random hydroxyl functionality as defined heretofore, such as 2-hydroxyethyl acrylate, allyl alcohol, vinyl benzyl alcohol, and the like; and (l) other vinylidene monomers such as bis(β-chloroethyl) vinyl phosphonate, diacetone acrylamide, and the like. Excellent results were obtained using 2-hydroxyethyl acrylate and diacetone acrylamide.

Examples of useful polymeric backbones in the hydroxylated liquid alkyl acrylate polymers include poly(butyl acrylate/N-vinyl-2-pyrrolidone/butadiene/acrylic acid), wherein the acrylic acid moiety is hydroxylated after polymerization using ethylene oxide or the like to provide random hydroxyl group(s) in a backbone unit equivalent to 2-hydroxyethyl acrylate. Also suitable are poly(n-butyl acrylate/N-vinyl-2-pyrrolidone/2-hydroxyethyl acrylate), poly(n-butyl acrylate/N-vinyl-2-pyrrolidone/ethyl acrylate/2-hydroxyethyl acrylate), and poly(n-butyl acrylate/N-vinyl-2-pyrrolidone/butadiene/2-hydroxyethyl acrylate/acrylonitrile). In the latter three backbones, random hydroxylation is provided using 2-hydroxyethyl acrylate. Of course, each polymer backbone has terminal hydroxyl functionality linked thereto by method(s) such as the four described heretofore. Thus, the alkyl acrylate liquid polymer contains both terminal and random hydroxyl functionality.

II. PREPOLYMER OF GLYCOL AND DIISOCYANATE

Component (B) of the pressure sensitive adhesive of the present invention comprises a prepolymer of a polyalkylene ether glycol or polyester glycol with an excess amount of an aromatic diisocyanate. Suitable polyalkylene ether glycols are produced by methods well known to the art, contain from 3 to 6 carbon atoms per alkylene group, and have a molecular weight from about 400 to about 2,000, such as polypropylene ether glycol, polytetramethylene ether glycol (PTMEG), and the like. Preferred polyalkylene ether glycols contain from 3 to 5 carbon atoms per alkylene group and have a molecular weight from about 400 to 1,500. Excellent results were obtained using polytetramethylene ether glycol having a molecular weight of about 600. Mixtures of polyalkylene ether glycols may also be used.

Polyester glycols are less preferred for use in the prepolymers. Polyester glycols may be prepared by methods well known to the art for use in the prepolymer, e.g., by an esterification reaction of an aliphatic dicarboxylic acid or anhydride thereof with a glycol. Molar ratios of more than one mole of glycol to acid are preferred in order to obtain linear chains containing a preponderance of terminal hydroxyl groups. Suitable aliphatic dicarboxylic acids include adipic, succinic, pimelic, suberic, azelaic, sebacic and the like or their anhydrides. Preferred dicarboxylic acids are those of the formula HOOC—R—COOH, wherein R is an alkylene radical containing 2 to 8 carbon atoms. More preferred are those represented by the formula $HOOC(CH_2)_xCOOH$, wherein x is a number from 2 to 8. Adipic acid is preferred. The glycols used in the preparation of the polyester by reaction with the aliphatic dicarboxylic acid are preferably straight chain glycols containing between 4 and 10 carbon atoms such as 1,4-butanediol, 1,6-hexanediol, 1,8-octanediol and the like. In general the glycol is more preferably of the formula $HO(CH_2)_xOH$, wherein x is 4 to 8. The preferred glycol is 1,4-butanediol.

Aromatic diisocyanates suitable for use in the isocyanate-terminated prepolymers contain from 8 to about 24 carbon atoms, preferably from 8 to 16 carbon atoms. Examples of suitable aromatic diisocyanates include p-phenylene diisocyanate, 2,4 and 2,6 isomers of toluene diisocyanate (TDI), 4,4'-biphenylene diisocyanate, 4,4'-diphenylmethylene diisocyanate (MDI), 1,5-naphthalene diisocyanate, and the like. Mixtures of aromatic diisocyanates may also be used. Excellent results were obtained using mixtures of 2,4-toluene diisocyanate and 2,6-toluene diisocyanate, particularly a mixture of about 65 weight percent 2,4-toluene diisocyanate and 35 weight percent 2,6-toluene diisocyanate, and a mixture of about 80 weight percent 2,4-toluene diisocyanate and 20 weight percent 2,6-toluene diisocyanate.

The isocyanate-terminated prepolymers may be prepared by reacting an excess (in equivalents) of the aromatic diisocyanate with the polyalkylene ether or polyester glycol described heretofore. The prepolymers may have molecular weights from about 800 to about 3,000, preferably from about 900 to about 2,000. The prepolymers must contain excess isocyanate (free NCO), typically from about 2 weight percent to about 10 weight percent excess, more preferably from about 4 weight percent to about 7 weight percent excess, based upon prepolymer weight. Excellent results were obtained using a prepolymer of toluene diisocyanate and polytetramethylene ether glycol, the prepolymer having a molecular weight of about 1,350 and about 6 weight percent free NCO, sold under the trademark Adiprene L-167 by E. I. duPont de Nemours & Co. Excellent results also were obtained using a prepolymer of toluene diisocyanate and polypropylene ether glycol, the prepolymer having a molecular weight of about 1,775 and about 5 weight percent free NCO, sold under the trademark Castomer E-0002 by Witco Chemical Corporation.

The isocyanate-terminated prepolymers may be blocked using known blocking agents such as phenols, tertiary alcohols, hydrocyanic acid, oximes such as methyl ethyl ketoxime, and the like. The blocked prepolymer and a both random- and terminal-hydroxylated alkyl acrylate liquid polymer described heretofore may be mixed to form the adhesive composition of the present invention. Blocking allows storage of the mixture for extended time periods at ambient temperatures without substantial reaction and without adverse effects upon ultimate adhesive properties. The blocked prepolymer in the mixture may be unblocked by heating, typically to about 100°–150° C., and the adhesive composition cured to its final pressure-sensitive state.

III. PRESSURE-SENSITIVE ADHESIVE

The pressure-sensitive adhesive of the present invention comprises the reaction product of (A) at least one alkyl acrylate liquid polymer containing polymerized therein about 1–20 weight percent N-vinyl-2-pyrrolidone, as well as both terminal and random hydroxyl functionality, and (B) at least one prepolymer of a polyalkylene ether glycol or polyester glycol with an excess amount of an aromatic diisocyanate. The adhesive has a full range of suitable adhesive properties, including excellent rolling ball tack, 180° peel adhesion and shear adhesion. Both clarity and 180° peel adhesion are improved over compositions wherein no N-vinyl-2-pyrrolidone is used.

The hydroxylated acrylate liquid polymer (A) is used in a ratio to isocyanate-terminated prepolymer (B) sufficient to provide a ratio of about 0.7 to about 4.5 hydroxyl equivalents per free isocyanate equivalent. A preferred ratio is about 1.2 to about 4 hydroxyl equivalents per equivalent of free isocyanate.

Catalysts well known to the art may be used for the hydroxyl-isocyanate reaction, typically in amounts from about 0.001% to about 0.5% by weight of total reactants. Suitable catalysts include stannous salts of aliphatic carboxylic acids containing from 1 to 20 carbon atoms, such as stannous octoate, stannous neodecanoate, and the like. Other suitable catalysts include lead naphthenate, dibutyltin dilaurate, and the like. Excellent results were obtained using dibutyltin dilaurate.

A solvent for the pressure-sensitive adhesive composition need not be used in order to avoid toxicity and flammability problems, excessive bulk per unit amount of adhesive, and extra cost of the solvent itself. However, a solvent or solvent mixture may be desired in some cases to enhance compatability and flow properties of the pressure-sensitive adhesive components before and during reaction. As is usually true with isocyanate-containing compositions, it is desirable to exclude as much water as possible; therefore, the solvents should be as anhydrous as possible. Suitable solvents include liquid aromatic hydrocarbons such as benzene, toluene, xylene, mesitylene, and the like; liquid ketones such as methyl ethyl ketone, methyl butyl ketone, and the like; liquid chlorinated hydrocarbons such as methylene chloride, 1,1,1-trichloroethane and the like; liquid esters such as ethyl acetate, ethoxyethyl acetate and the like; and liquid alkanes such as pentane, hexane, heptane and the like. Solvent mixtures may also be used. Excellent results were obtained using toluene together with ethyl acetate.

A tackifying additive is not required but may be used to impart increased pressure-sensitivity and tackiness to an adhesive of this invention. A tackifier may be used in an amount from about 10 to about 30 parts by weight and more of tackifier per 100 parts by weight of adhesive. Suitable tackifying additives include chlorinated biphenyl resins, such as chlorinated biphenyl and chlorinated polyphenyl; coumarone-indene resins, such as polymerized coal-tar light oils; plasticizers such as dioctyl phthalate; polystyrenes such as poly(α-methyl styrene); polyterpene resins, such as poly(β-pinene); rosin and rosin derivatives, such as the glycerol ester of hydrogenated rosin and the methyl ester of hydrogenated rosin; and the like. Chain extenders may be used, including polyols such as the glycols described in connection with preparation of the isocyanate-terminated prepolymer, as well as amines and the like. Other additives known in the art may also be used, such as antioxidants, photo-stabilizers, flow modifiers including sintered colloidal silicas such as those sold under the trademark Cab-O-Sil by Cabot Corporation, and the like.

The components of the pressure-sensitive adhesive may be combined and mixed in any order and by any method that (1) provides both a final homogeneous liquid mixture or solution and (2) allows sufficient time after mixing so that casting or application can be performed before substantial thickening or solidification occurs. Such mixing techniques are well known in the art and may be performed using equipment such as the Liquid Control Corp. Twinflo ® machine.

When mixing is complete, the mixture is applied to a substrate such as paper, plastic film, release paper, metal foil, or the like. Conventional application or casting means can be used to meter and obtain a desired uniform thickness across a given substrate, such as a wire-wound rod, gravure coater, differential roll coater, reverse roll coater, knife-over-roll coater or the like.

The coated substrate is generally cured partially or completely by heating before winding, particularly if a solvent is used. However, the coated substrate may be wound before curing if a bulk adhesive without solvent is used. Suitable heating means include circulating air ovens, infrared heaters and heated drums.

The following examples illustrate the present invention more fully.

EXAMPLES

I. Materials

A. Alkyl Acrylate Liquid Polymers Containing Both Terminal and Random Hydroxyl Functionality — Method #4

Alkyl acrylate liquid polymers containing both random and terminal hydroxyl functionality were prepared according to method #4 described heretofore, i.e., by polymerizing a given monomer mixture in the presence of 2-hydroxyethyl disulfide and azoisobutyronitrile. Terminal hydroxyl groups were supplied using the 2-hydroxyethyl disulfide, and random hydroxyl groups were provided using 2-hydroxyethyl acrylate. Polymers were produced both with and without N-vinyl-2-pyrrolidone for comparison purposes.

Example 1 Polymer

By way of illustration, an alkyl acrylate polymer containing N-vinyl-2-pyrrolidone and both terminal and random hydroxyl functionality was prepared using the following recipe:

| Material | Parts | Wt. (lbs.) |
|---|---|---|
| n-Butyl Acrylate | 93 | 34.8 |
| N-Vinyl-2-Pyrrolidone | 5 | 1.87 |
| 2-Hydroxyethyl Acrylate | 2 | 0.75 |
| 2-Hydroxyethyl Disulfate | 6 | 2.24 |
| Azoisobutyronitrile | 1 | 0.37 |
| Acetone Solvent | 50 | 18.7 |
| | 157 | 58.73 |

A blend of 2.24 lbs. 2-hydroxyethyl disulfide and 8.7 lbs. acetone was prepared (blend #1). Also prepared was a blend of 34.8 lbs. n-butyl acrylate, 0.75 lbs. 2-hydroxyethyl acrylate, and 1.87 lbs. N-vinyl-2-pyrrolidone (blend #2), and a blend of 0.37 lbs. azoisobutyronitrile and 10 lbs. acetone (blend #3).

A 15-gallon reactor was equipped with a twin-blade turbine stirrer, and a feed tank, dip tube and proportioning pumps for feeding monomers into the reactor. The reactor was cleaned thoroughly with acetone and dried with nitrogen. The reactor was evacuated three times and the vacuum broken each time with nitrogen. Thereafter a small nitrogen purge was maintained during polymerization. Agitation was begun, and blend #1 was charged to the reactor and heated quickly to 90° C. Blends #2 and #3 were proportioned separately into the reactor over a period of about 50 minutes. When charging was complete, reaction was continued for about 2 more hours, after which the reactor and contents were cooled rapidly to about 30° C. Reactor contents were dried at about 115° C. and 100 mm Hg using a Rodney-Hunt evaporator.

A liquid polymer was recovered. It was a hydroxyl-terminated poly(n-butyl acrylate/N-vinyl-2-pyrrolidone/2-hydroxyethyl acrylate) having both terminal and random hydroxyl functionality. The polymer had a Brookfield viscosity at 25° C. of about 290,000 cps, a molecular weight ($\overline{M}_n$) of about 3,400, and a hydroxyl number of 46.

Example 2 Polymer

Similarly, an alkyl acrylate polymer containing both terminal and random hydroxyl functionality but no N-vinyl-2-pyrrolidone was prepared using this recipe:

| Material | Parts | Wt. (lbs.) |
|---|---|---|
| n-Butyl Acrylate | 90 | 36.0 |
| 2-Hydroxyethyl Acrylate | 2 | 0.8 |
| 2-Hydroxyethyl Disulfide | 6 | 2.4 |
| Azoisobutyronitrile | 1 | 0.4 |
| Acetone Solvent | 50 | 20.0 |
| | 149 | 59.6 |

A blend of 2.4 lbs. 2-hydroxyethyl disulfide and 10 lbs. acetone was prepared (blend #1). Also prepared was a blend of 36.0 lbs. n-butyl acrylate and 0.8 lb. 2-hydroxyethyl acrylate (blend #2), and a blend of 0.4 lb. azoisobutyronitrile and 10 lbs. acetone (blend #3).

The three blends were charged, reacted and recovered by the same general procedure used to produce the example 1 polymer. The example 2 polymer was a liquid polymer. It was a hydroxyl-terminated poly(n-butyl acrylate/2-hydroxyethyl acrylate) having both terminal and random hydroxyl functionality. The example 2 polymer had a Brookfield viscosity at 25° C. of about 85,000 cps, a molecular weight ($\overline{M}_n$) of about 2,900 and a hydroxyl number of 49.

Polymers for examples 3-6 were prepared following the same general reaction procedure as for examples 1 and 2.

B. Prepolymer of Glycol and Diisocyanate

Component (B) of the pressure-sensitive adhesives in the examples was a prepolymer of polypropylene ether glycol and toluene diisocyanate. The prepolymer was found to have a molecular weight of about 1,775 and to contain about 5 weight percent free NCO. The prepolymer is sold under the trademark Castomer E-0002 by Witco Chemical Corporation.

II. Test Procedures

The hydroxylated liquid polymers in examples 1 and 2 were tested for clarity by measuring % transmission (and absorbance) of light at varying wavelengths from 500 to 750 nm using a Beckman DK-2A spectrophotometer operating at room temperature at a scan speed of 20 nm/minute.

Each adhesive in examples 3-6 was tested using three standard Pressure Sensitive Tape Council (PSTC) standard test methods: (1) rolling ball tack (PSTC-6, issued 10/64); (2) 180° peel adhesion (PSTC-1, revised 4/66); and (3) shear adhesion at 70° C. (commonly called static shear—see PSTC-7, revised 4/66).

A maximum desirable test value for rolling ball tack after curing of a given test sample was 4 inches. Minimum desirable test values after curing of a given sample were 16 oz./inch for 180° peel adhesion and 48 hours for shear adhesion (static shear).

III. Examples 1 and 2

Example 1 demonstrates that a terminal- and random-hydroxylated n-butyl acrylate liquid polymer containing N-vinyl-2-pyrrolidone has substantially better clarity (i.e., more light transmission) than the example 2 polymer wherein no N-vinyl-2-pyrrolidone was used.

Test results are summarized in Table I.

TABLE I

| Example | 1 | 2 |
|---|---|---|
| Monomers used in Preparing Terminal- and Random-Hydroxylated Liquid Polymer (Wt. Parts) | | |
| n-Butyl Acrylate | 93 | 90 |
| N-Vinyl-2-Pyrrolidone | 5 | 0 |

TABLE I-continued

| Example | 1 | 2 |
|---|---|---|
| 2-Hydroxyethyl Acrylate | 2 | 2 |
| 2-Hydroxyethyl Disulfide | 6 | 6 |
| % Light Transmission at Varying Wavelengths | | |
| 500 nm | 93 | 1 |
| 600 nm | 94 | 10 |
| 700 nm | 95 | 25 |
| 750 nm | 96 | 31 |

IV. Examples 3–6

The data in examples 3–6 demonstrates improved adhesion of pressure-sensitive adhesives containing N-vinyl-2-pyrrolidone (examples 3 and 5) over adhesives wherein no N-vinyl-2-pyrrolidone is present (examples 4 and 6). The adhesives of example 3 and 5 were also found to have better clarity than those of examples 4 and 6.

In each of examples 3–6 (1) a hydroxylated liquid polymer was mixed with (2) Castomer E-0002 as an 80 weight percent solids solution in (3) a solvent mixture of 73 weight percent toluene and 27 weight percent ethyl acetate. The components were stirred with a spatula until homogeneous, immediately after which dibutyl tin dilaurate catalyst was added (1 drop catalyst to samples containing 10 grams liquid polymer, and 2 drops catalyst to samples containing 15 grams liquid polymer). Each sample was drawn down as approximately a 0.00125 inch sheet on Mylar film using a Gardner knife applicator set at 0.004 inch. Each sample was cured for 2 minutes at 150° C., and thereafter allowed to stand overnight before testing (sample preparation).

Test data is set forth in Table II.

TABLE II

| Example | 3A | 3B | 3C | 4A | 4B | 4C | 5A | 5B | 5C | 6A | 6B | 6C |
|---|---|---|---|---|---|---|---|---|---|---|---|---|
| Monomers Used In Manufacturing Terminal and Random-Hydroxylated Liquid Polymer (Wt. Parts) | | | | | | | | | | | | |
| n-Butyl Acrylate | 93 | 93 | 93 | 98 | 98 | 98 | 93 | 93 | 93 | 98 | 98 | 98 |
| N-Vinyl-2-Pyrrolidone | 5 | 5 | 5 | — | — | — | 5 | 5 | 5 | — | — | — |
| 2-Hydroxyethyl Acrylate | 2 | 2 | 2 | 2 | 2 | 2 | 2 | 2 | 2 | 2 | 2 | 2 |
| 2-Hydroxyethyl Disulfide | 3 | 3 | 3 | 3 | 3 | 3 | 6 | 6 | 6 | 6 | 6 | 6 |
| Pressure-Sensitive Adhesive Recipe (grams) | | | | | | | | | | | | |
| OH/NCO Equivalents Ratio | 1.4 | 1.45 | 1.5 | 1.4 | 1.45 | 1.5 | 1.4 | 1.45 | 1.5 | 1.4 | 1.45 | 1.5 |
| Hydroxylated Liquid Polymer | 10 | 10 | 10 | 10 | 10 | 10 | 15 | 15 | 15 | 15 | 15 | 15 |
| Castomer E-0002 | 4.93 | 3.76 | 4.60 | 3.54 | 3.41 | 3.30 | 5.51 | 5.32 | 5.15 | 8.52 | 8.23 | 7.95 |
| Pressure-Sensitive Adhesive Test Data | | | | | | | | | | | | |
| OH/NCO Equivalents Ratio | 1.4 | 1.45 | 1.5 | 1.4 | 1.45 | 1.5 | 1.4 | 1.45 | 1.5 | 1.4 | 1.45 | 1.5 |
| Rolling Ball Tack (in.) | 0.85 | 0.85 | 0.85 | 1.39 | 1.1 | 0.87 | 1.4 | 1.1 | 1.1 | 1.2 | 1.0 | 1.0 |
| 180° Peel Adhesion (oz./in)* | 27 | 27 | 29 | 14 | 24 | 23 | 42 | 57 | 69 | 34 | 47 | 54 |
| Shear Adhesion at 70° C. (hrs.) | 120+ | 120+ | 120+ | 120+ | 120+ | 120+ | 120+ | 120+ | 120+ | 120+ | 120+ | 120+ |

*Average of 3 runs.

The data in Table II demonstrates that N-vinyl-2-pyrrolidone improves 180° peel adhesion in the pressure-sensitive adhesives of this invention.

Examples 3 and 4 were polymerized in the presence of 3 weight parts 2-hydroxyethyl disulfide per 100 weight parts backbone monomers (n-butyl acrylate, 2-hydroxyethyl acrylate, and in example 3 only, N-vinyl-2-pyrrolidone). 180° peel adhesion in example 3 (containing N-vinyl-2-pyrrolidone in the hydroxylated liquid polymer) was superior to that of example 4 (wherein no N-vinyl-2-pyrrolidone was used).

Examples 5 and 6 were polymerized in the presence of 6 weight parts 2-hydroxyethyl disulfide per 100 weight parts backbone monomers (n-butyl acrylate, 2-hydroxyethyl acrylate and, in example 5 only, N-vinyl-2-pyrrolidone). 180° peel adhesion in example 5 (containing N-vinyl-2-pyrrolidone in the hydroxylated liquid polymer) was superior to that of example 6 (wherein no N-vinyl-2-pyrrolidone was used).

The improved random- and terminal-hydroxylated alkyl acrylate liquid polymers of this invention are useful in the pressure-sensitive adhesives described herein, which in turn may be used in solution or in bulk for labels, other laminate structures and the like.

I claim:

1. A composition comprising (A) at least one alkyl acrylate liquid polymer containing polymerized therein from about 1 weight percent to about 20 weight percent N-vinyl-2-pyrrolidone and containing both terminal and random hydroxyl functionality, and (B) at least one prepolymer of a polyalkylene ether glycol or polyester glycol with an excess amount of an aromatic diisocyanate, wherein
   (1) said alkyl acrylate liquid polymer contains an average from about 1.4 to about 6 hydroxyl groups per molecule, and contains polymerized therein at least about 65 weight percent of at least one alkyl acrylate, the alkyl group of which contains from 3 to 10 carbon atoms,
   (2) said polyalkylene ether glycol contains from 3 to 6 carbon atoms per alkylene group and has a molecular weight from about 400 to about 2,000,
   (3) said aromatic diisocyanate contains from 8 to about 24 carbon atoms,
   (4) said prepolymer has a molecular weight from about 900 to about 3,000, and
   (5) the ratio of hydroxyl equivalents to free isocyanate equivalents is from about 0.7/1 to about 4.5/1.

2. A composition of claim 1 wherein said alkyl acrylate liquid polymer has a molecular weight from about 1,000 to about 6,000, and said prepolymer contains from about 2 weight percent to about 10 weight percent excess isocyanate based upon prepolymer weight.

3. A composition of claim 1 wherein said alkyl acrylate liquid polymer contains copolymerized therein at least one other olefinically unsaturated monomer.

4. A composition of claim 3 wherein said olefinically unsaturated monomer is a vinylidene comonomer containing at least one terminal $CH_2=C<$ group per molecule.

5. A composition of claim 4 wherein said vinylidene comonomer is selected from the group consisting of (a) dienes containing 4 to 10 carbon atoms, (b) vinyl nitriles having the formula

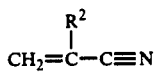

wherein $R^2$ is hydrogen or an alkyl group containing 1 to 3 carbon atoms, (c) acrylates having the formula

wherein $R^3$ is hydrogen or an alkyl radical containing 1 to 3 carbon atoms, and $R^4$ is hydrogen or an alkyl radical containing 1, 2 or 11 to 18 carbon atoms or an alkoxyalkyl, alkylthioalkyl, or cyanoalkyl radical containing 2 to 12 carbon atoms, or wherein $R^3$ is an alkyl radical containing 1 to 3 carbon atoms and $R^4$ is an alkyl radical containing 3 to 10 carbon atoms, (d) vinyl aromatics having the formula

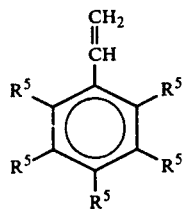

wherein $R^5$ is hydrogen, halogen or an alkyl radical containing 1 to 4 carbon atoms, (e) vinyl and allyl esters of carboxylic acids containing 2 to 8 carbon atoms, (f) vinyl and allyl ethers of alkyl radicals containing 1 to 8 carbon atoms, (g) monoolefins containing 2 to 14 carbon atoms, (h) vinyl halides, (i) divinyls and diacrylates, (j) amides of $\alpha,\beta$-olefinically unsaturated carboxylic acids containing 2 to 8 carbon atoms, (k) hydroxyl-containing vinylidene monomers, and (l) diacetone acrylamide.

6. A composition of claim 5 wherein said vinylidene comonomer is selected from the group consisting of said dienes, vinyl nitriles, acrylates, hydroxyl-containing vinylidene monomers and diacetone acrylamide.

7. A composition of claim 6 wherein said vinylidene comonomer is selected from the group consisting of butadiene, acrylonitrile, ethyl acrylate, propyl acrylate, a hydroxyl-containing ester of acrylic acid, and diacetone acrylamide.

8. A composition of claim 7 wherein component B is a prepolymer of polytetramethylene ether glycol with toluene diisocyanate, or a prepolymer of polypropylene ether glycol with toluene diisocyanate.

9. A composition of claim 8 wherein the backbone of said alkyl acrylate liquid polymer (component A) contains polymerized therein n-butyl acrylate, N-vinyl-2-pyrrolidone, butadiene, and a hydroxyl-containing ester of acrylic acid.

10. A composition of claim 9 wherein said hydroxyl-containing ester of acrylic acid is 2-hydroxyethyl acrylate.

11. A composition of claim 8 wherein the backbone of said alkyl acrylate liquid polymer (component A) contains polymerized therein n-butyl acrylate, N-vinyl-2-pyrrolidone, butadiene, acrylonitrile, and a hydroxyl-containing ester of acrylic acid.

12. A composition of claim 11 wherein said hydroxyl-containing ester of acrylic acid is 2-hydroxyethyl acrylate.

13. A composition of claim 8 wherein the backbone of said alkyl acrylate liquid polymer (component A) contains polymerized therein n-butyl acrylate, N-vinyl-2-pyrrolidone, ethyl acrylate and a hydroxyl-containing ester of acrylic acid.

14. A composition of claim 13 wherein said hydroxyl-containing ester of acrylic acid is 2-hydroxyethyl acrylate.

15. A cured composition of claim 1.

16. A laminate structure having as adhesive a composition comprising (A) at least one alkyl acrylate liquid polymer containing polymerized therein from about 1 weight percent to about 20 weight percent N-vinyl-2-pyrrolidone and containing both terminal and random hydroxyl functionality, and (B) at least one prepolymer of a polyalkylene ether glycol or polyester glycol with an excess amount of an aromatic diisocyanate, wherein
(1) said alkyl acrylate liquid polymer contains an average from about 1.4 to about 6 hydroxyl groups per molecule, and contains polymerized therein at least about 65 weight percent of at least one alkyl acrylate, the alkyl group of which contains from 3 to 10 carbon atoms,
(2) said polyalkylene ether glycol contains from 3 to 6 carbon atoms per alkylene group and has a molecular weight from about 400 to about 2,000,
(3) said aromatic diisocyanate contains from 8 to about 24 carbon atoms,
(4) said prepolymer has a molecular weight from about 900 to about 3,000, and
(5) the ratio of hydroxyl equivalents to free isocyanate equivalents is from about 0.7/1 to about 4.5/1.

17. A laminate structure of claim 16 wherein said alkyl acrylate liquid polymer has a molecular weight from about 1,000 to about 6,000, and said prepolymer contains from about 2 weight percent to about 10 weight percent excess isocyanate based upon prepolymer weight.

18. A laminate structure of claim 16 wherein said alkyl acrylate liquid polymer contains copolymerized therein at least one other olefinically unsaturated monomer.

19. A laminate structure of claim 18 wherein said olefinically unsaturated monomer is a vinylidene comonomer containing at least one terminal $CH_2=C<$ group per molecule.

20. A laminate structure of claim 19 wherein said vinylidene comonomer is selected from the group consisting of (a) dienes containing 4 to 10 carbon atoms, (b) vinyl nitriles having the formula

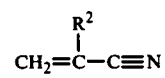

wherein $R^2$ is hydrogen or an alkyl group containing 1 to 3 carbon atoms, (c) acrylates having the formula

wherein $R^3$ is hydrogen or an alkyl radical containing 1 to 3 carbon atoms, and $R^4$ is hydrogen or an alkyl radical containing 1, 2 or 11 to 18 carbon atoms or an alkoxyalkyl, alkylthioalkyl, or cyanoalkyl radical containing 2 to 12 carbon atoms, or wherein $R^3$ is an alkyl radical containing 1 to 3 carbon atoms and $R^4$ is an alkyl radical containing 3 to 10 carbon atoms, (d) vinyl aromatics having the formula

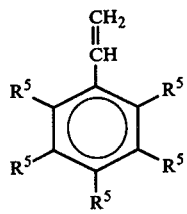

wherein $R^5$ is hydrogen, halogen or an alkyl radical containing 1 to 4 carbon atoms, (e) vinyl and allyl esters of carboxylic acids containing 2 to 8 carbon atoms, (f) vinyl and allyl ethers of alkyl radicals containing 1 to 8 carbon atoms, (g) monoolefins containing 2 to 14 carbon atoms, (h) vinyl halides, (i) divinyls and diacrylates, (j) amides of α,β-olefinically unsaturated carboxylic acids containing 2 to 8 carbon atoms, (k) hydroxyl-containing vinylidene monomers, and (l) diacetone acrylamide.

21. A laminate structure of claim 20 wherein said vinylidene comonomer is selected from the group consisting of said dienes, vinyl nitriles, acrylates, hydroxyl-containing vinylidene monomers and diacetone acrylamide.

22. A laminate structure of claim 21 wherein said vinylidene comonomer is selected from the group consisting of butadiene, acrylonitrile, ethyl acrylate, propyl acrylate, a hydroxyl-containing ester of acrylic acid, and diacetone acrylamide.

23. A laminate structure of claim 22 wherein component B is a prepolymer of polytetramethylene ether glycol with toluene diisocyanate, or a prepolymer of polypropylene ether glycol with toluene diisocyanate.

24. A laminate structure of claim 23 wherein the backbone of said alkyl acrylate liquid polymer (component A) contains polymerized therein n-butyl acrylate, N-vinyl-2-pyrrolidone, butadiene, and a hydroxyl-containing ester of acrylic acid.

25. A laminate structure of claim 24 wherein said hydroxyl-containing ester of acrylic acid is 2-hydroxyethyl acrylate.

26. A laminate structure of claim 23 wherein the backbone of said alkyl acrylate liquid polymer (component A) contains polymerized therein n-butyl acrylate, N-vinyl-2-pyrrolidone, butadiene, acrylonitrile, and a hydroxyl-containing ester of acrylic acid.

27. A laminate structure of claim 26 wherein said hydroxyl-containing ester of acrylic acid is 2-hydroxyethyl acrylate.

28. A laminate structure of claim 23 wherein the backbone of said alkyl acrylate liquid polymer (component A) contains polymerized therein n-butyl acrylate, N-vinyl-2-pyrrolidone, ethyl acrylate and a hydroxyl-containing ester of acrylic acid.

29. A laminate structure of claim 28 wherein said hydroxyl-containing ester of acrylic acid is 2-hydroxyethyl acrylate.

30. A cured laminate structure of claim 16.

31. A process comprising mixing and curing a composition comprising (A) at least one alkyl acrylate liquid polymer containing polymerized therein from about 1 weight percent to about 20 weight percent N-vinyl-2-pyrrolidone and containing both terminal and random hydroxyl functionality, and (B) at least one prepolymer of a polyalkylene ether glycol or polyester glycol with an excess amount of an aromatic diisocyanate, wherein
  (1) said alkyl acrylate liquid polymer contains an average from about 1.4 to about 6 hydroxyl groups per molecule, and contains polymerized therein at least about 65 weight percent of at least one alkyl acrylate, the alkyl group of which contains from 3 to 10 carbon atoms,
  (2) said polyalkylene ether glycol contains from 3 to 6 carbon atoms per alkylene group and has a molecular weight from about 400 to about 2,000,
  (3) said aromatic diisocyanate contains from 8 to about 24 carbon atoms,
  (4) said prepolymer has a molecular weight from about 900 to about 3,000, and
  (5) the ratio of hydroxyl equivalents to free isocyanate equivalents is from about 0.7/1 to about 4.5/1.

32. A composition of claim 8 wherein the backbone of said alkyl acrylate liquid polymer (component A) contains polymerized therein n-butyl acrylate, N-vinyl-2-pyrrolidone, and a hydroxyl-containing ester of acrylic acid.

33. A composition of claim 32 wherein said hydroxyl-containing ester of acrylic acid is 2-hydroxyethyl acrylate.

34. A laminate structure of claim 23 wherein the backbone of said alkyl acrylate liquid polymer (component A) contains polymerized therein n-butyl acrylate, N-vinyl-2-pyrrolidone, and a hydroxyl-containing ester of acrylic acid.

35. A laminate structure of claim 34 wherein said hydroxyl-containing ester of acrylic acid is 2-hydroxyethyl acrylate.